United States Patent
Ogborn et al.

(10) Patent No.: US 10,322,473 B2
(45) Date of Patent: Jun. 18, 2019

(54) LOW MANGANESE WELDING ELECTODES

(71) Applicant: Lincoln Global, Inc., City of Industry, CA (US)

(72) Inventors: Jonathan S Ogborn, Concord Twp., OH (US); Daniel J Langham, Valley City, OH (US); Radhika R Panday, Mayfield Village, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 733 days.

(21) Appl. No.: 15/017,574

(22) Filed: Feb. 5, 2016

(65) Prior Publication Data
US 2016/0236302 A1    Aug. 18, 2016

Related U.S. Application Data

(60) Provisional application No. 62/117,777, filed on Feb. 18, 2015.

(51) Int. Cl.
*B23K 35/30* (2006.01)
*B23K 35/22* (2006.01)

(52) U.S. Cl.
CPC .......... *B23K 35/3053* (2013.01); *B23K 35/22* (2013.01); *B23K 35/30* (2013.01)

(58) Field of Classification Search
CPC .... B23K 35/3035; B23K 35/30; B23K 35/22; B23K 35/0294; B23K 35/0255; B23K 35/00; B23K 35/0266; B23K 35/35; B23K 35/0272; B23K 35/0288; B23K 35/3026; B23K 35/362; B23K 35/3601
See application file for complete search history.

(56) References Cited

U.S. PATENT DOCUMENTS

| 9,844,838 B2 * | 12/2017 | Barhorst ............ B23K 35/3053 |
| 10,112,267 B2 * | 10/2018 | Takayama ............ B23K 35/368 |
| 2014/0097168 A1 | 4/2014 | Ferree et al. |

* cited by examiner

*Primary Examiner* — David J Walczak

(57) ABSTRACT

Flux cored welding electrodes comprise a iron based metal sheath and either a flux or metal core within the sheath, enclosing core ingredients. The core ingredients and sheath together comprise, in weight percentages based on the total weight of the electrode, very low levels of manganese. While having low levels of manganese the electrodes satisfy the strength and safety requirements required of commercial electrodes. Embodiments contain manganese in the range of 0.09 to 0.19% by weight of the electrode, along with other components.

22 Claims, 1 Drawing Sheet

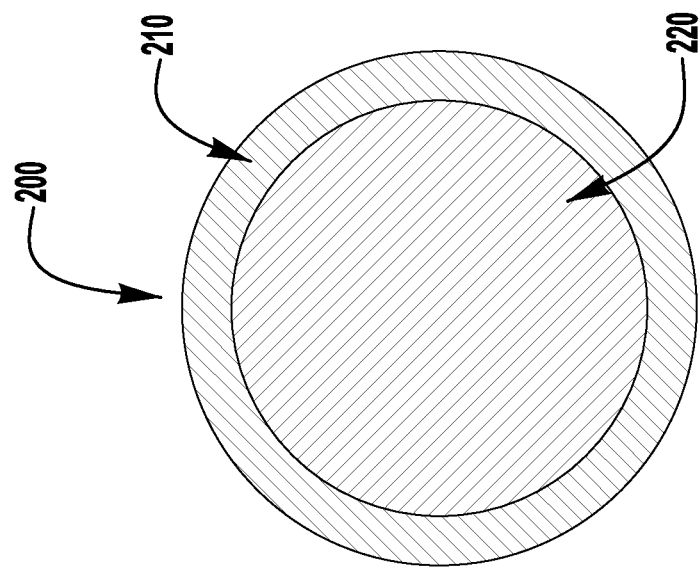
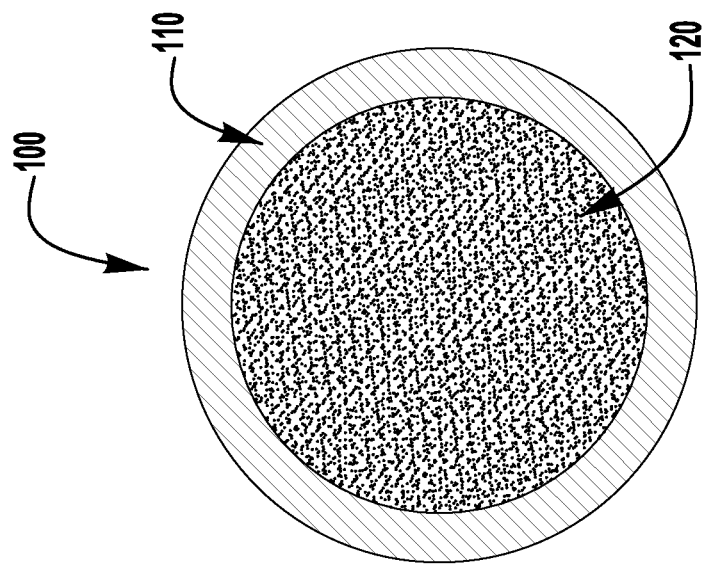

LOW MANGANESE WELDING ELECTODES

PRIORITY

The present application claims priority to U.S. Provisional Application No. 62/117,777, filed on Feb. 18, 2015, the entire disclosure of which is incorporated herein by reference.

TECHNICAL FIELD

Certain embodiments relate to welding electrodes having a low manganese content, and more specifically to flux cored, metal cored and solid welding electrodes having a low manganese content and producing a weld deposit with low manganese.

BACKGROUND

The American Welding Society specifications AWS A5.20/A5.20M and AWS A5.36/A5.36M, and other similar global specifications, govern the technical requirements for flux cored electrodes designed for welding carbon steels. For gas-shielded flux cored carbon steel electrodes classified as E7XT-1C, E7XT-1M, E7XT-9C, E7XT-9M, E7XT-12C, and E7XT-12M and containing titanium dioxide ($TiO_2$) based slag systems, AWS A5.20/A5.20M and AWS A5.36/A5.36M require the alloy content in the weld metal to be no greater than 175% manganese (1.60% for E7XT-12 type), 0.12% carbon, 0.90% silicon, 0.20% chromium, 0.50% nickel, 0.30% molybdenum, 0.08% vanadium, and 0.35% copper Although nickel is beneficial to weld metal toughness and ductility properties, the maximum allowed nickel level in these electrode types is fairly restrictive. Therefore, carbon, manganese, molybdenum, and silicon levels typically are adjusted to optimize weld metal properties.

In general, conventional gas-shielded flux cored welding electrodes with titanium dioxide based slag systems include significant levels of manganese and also may include small concentrations of boron to achieve desired weld metal toughness, tensile, and ductility properties. A drawback of conventional gas-shielded flux cored electrodes including titanium dioxide based slag systems is that the significant manganese levels that these electrodes contain may not meet certain emissions control regulations. For example, Metal Fabrication Hazardous Air Pollutants (MFHAP) requirements under U.S. Environmental Protection Agency regulations at 40 CFR Part 63 Subpart which recently became effective, limit the manganese content of certain welding electrodes to less than 1.0 weight percent, based on total electrode weight.

The objectives of the present disclosure are to provide a welding electrode that contains low levels of manganese and yet produces structurally sound weldments.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention include welding electrodes that have low levels of manganese, as compared to known electrodes, which produce welds having a low level of manganese in the weld deposit and satisfy various structural and mechanical requirements of weldments. Embodiments of the present invention include flux cored electrodes, metal cored electrodes and solid electrodes. Further exemplary embodiments include flux cored electrodes which are of the rutile slag type and the basic slag type.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which:

FIG. 1 is a diagrammatical representation of an exemplary embodiment of a flux cored electrode of the present invention; and FIG. 2 is a diagrammatical representation of an exemplary embodiment of a solid cored electrode of the present invention.

DETAILED DESCRIPTION

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Various welding electrode embodiments are described in this specification to provide an overall understanding of the invention. It is understood that the various embodiments described in this specification are non-limiting and non-exhaustive. Thus, the invention is not limited by the description of the various non-limiting and non-exhaustive embodiments disclosed in this specification. In appropriate circumstances, the features and characteristics described in connection with various embodiments may be combined with the features and characteristics of other embodiments. Such modifications and variations are intended to be included within the scope of this specification. As such, the claims may be amended to recite any steps, elements, limitations, features, and/or characteristics expressly or inherently described in, or otherwise expressly or inherently supported by, this specification. The various embodiments disclosed and described in this specification can comprise, consist of, and/or consist essentially of the elements, limitations, features, and/or characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", if and as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Various embodiments described herein are directed to gas-shielded flux cored welding electrodes including titanium dioxide based slag systems (rutile slag type) and calcium fluoride based slag systems (basic slag type) with low manganese content, and to solid core electrodes with low manganese content. The low manganese content in embodiments of welding electrodes described herein produce welding fumes including levels of manganese that are less than certain conventional gas-shielded flux cored welding electrodes. The manganese content in certain non-limiting embodiments of welding electrodes according to the present disclosure meets certain Metal Fabrication Hazardous Air Pollutants (MFHAP) requirements under U.S. Environmental Protection Agency regulations at 40 CFR Part 63 Subpart XXXXXX pertaining to alloying element content. In particular, EPA Subpart XXXXXX requires the electrode alloy content, based on total electrode weight, to be no greater than 1.0 weight percent manganese, 0.1 weight percent nickel, 0.1 weight percent chromium, 0.1 weight percent cadmium, and 0.1 weight percent lead.

Although it is known that manganese enhances certain weld metal properties, it is also considered a hazardous component of the welding fumes emitted from arc welding processes if inhaled above the levels established by certain health and safety organizations. Reducing manganese content in conventional gas-shielded flux cored electrodes can reduce the manganese level in the welding fumes. For example, US Publication No. 2014/0097168, which is incorporated herein by reference, discusses the weight percentage manganese in welding fumes as a function of electrode manganese content in E71T-9M flux cored welding electrodes during gas-shielded arc welding. However, reducing manganese content in a flux cored welding electrode also can reduce manganese content in the weld metal and, in turn, weld metal toughness, tensile, and ductility properties, which is also discussed in the above referenced publication.

Thus, welding electrode design must address competing concerns, and reducing manganese content in flux cored welding electrodes to address welding fume manganese levels may impair weld deposit mechanical properties. That is, there is a need for welding electrodes, of different types that meet or exceed the EPA Subpart XXXXXX 1.0% manganese maximum and 0.1% nickel maximum requirements, while also satisfying weld metal toughness, tensile, and ductility properties of AWS A5.20/A5.20M classifications E7XT-1C, E7XT-1M, E7XT-9C, E7XT-9M, E7XT-12C, and E7XT-12M.

As shown and discussed below, embodiments of the present invention satisfy this need in the welding industry with different types of electrodes as discussed herein. Embodiments of the present invention achieve this by optimizing the various ingredients in the electrodes to achieve welding electrodes which produce high quality welds, while at the same time significantly reducing the amount of manganese in each of the electrode, weld fume and weld deposit.

Non-limiting exemplary embodiments of the welding electrodes discussed herein have lower manganese levels than commercially available welding electrodes and thereby produce welding fumes with considerably less manganese. However, welding electrode embodiments according to the present disclosure still satisfy weld metal toughness, tensile, and ductility properties specified in AWS A5.20/A5.20M and AWS A5.36/A5.36M. The cored welding electrodes according to the present disclosure comprise a ferrous metal sheath and core ingredients enclosed with the ferrous metal sheath, and can include gas shielded cored electrodes. In exemplary embodiments of the present invention, the optimization of the combination of ingredients in the electrode, such as carbon, boron, silicon, molybdenum and titanium, magnesium, and/or aluminum contents can allow for a substantial reduction in manganese content of the welding electrodes relative to commercially available welding electrodes, while maintaining acceptable weld metal toughness, tensile, and ductility properties.

The exemplary cored electrodes according to the present disclosure may be fabricated using any conventional method of manufacturing such electrodes. In one non-limiting method of manufacturing welding electrodes according to the present disclosure, a coiled ferrous sheet steel is slit into strips. The strips are passed through rollers that form the strips into channels having a generally U-shaped cross-section. In the same operation, the formed strip is filled with a measured amount of particulate core ingredients. The U-shaped strip is then passed through closing rolls, forming the strip into a tube in which the core ingredients are enclosed. The tube is then drawn, rolled, or swaged to a desired size smaller than the original diameter of the formed tube, thereby providing a final welding electrode. The final electrode may be baked to remove residual lubricants and moisture or used in the unbaked condition, depending on the reduction process employed to manufacture the electrode. Other methods for making welding electrodes according to the present disclosure will be apparent to those having ordinary skill upon consider the present description.

After fabrication, gas-shielded flux cored electrodes according to the present disclosure may be used in a flux cored arc welding (FCAW) process wherein the shielding gas is selected from, for example, argon, carbon dioxide, oxygen, other inert gases, and mixtures of two or more thereof. Any FCAW equipment and process that incorporates a suitable power source, wire (electrode) feeder, gun, and system for supplying shielding gas can be used to weld materials using the gas-shielded flux cored welding electrodes according to the present disclosure. Exemplary electrodes discussed herein can also be used with different welding processes which are generally known, such as submerged arc welding, etc.

As shown below, the concentrations and ingredients discussed herein for the various electrode embodiments are given in weight percentages of the sheath, core or electrode as a whole as the context dictates. Further, reference to weld deposit herein refers to the undiluted weld deposit as understood by those of ordinary skill in the art.

Turning now to FIG. 1, an exemplary embodiment of a flux cored electrode 100 is shown. The electrode 100 has a sheath 110 and a flux core 120, where the sheath 110 is primarily made from a ferrous metal and the core 120 has a flux which is made up of various ingredients as discussed further herein. Exemplary embodiments of the flux cored electrode as discussed herein can be the rutile slag type or the basic slag type. Each of these exemplary embodiments will be discussed in turn below.

A first exemplary embodiment of the present invention is a gas shielded flux cored electrode (similar to that shown in FIG. 1) which uses a titanium dioxide based slag system. This is also referred to as a rutile type slag system. As shown below, embodiments of the present invention provide a flux cored electrode which has a very low level of manganese as compared to known electrodes—even those which purport to contain low levels of manganese. That is, in some exemplary embodiments of the present invention, the electrode has a manganese content in the range of 0.09 to 0.19% by weight of the entire electrode. In other exemplary embodiments, the manganese content is in the range of 0.12 to 0.18% by weight of the entire electrode. In further exemplary embodiments, of the present invention, the electrode can have a manganese content in the range of 0.14 to 0.16% by weight of the entire electrode. However, even with such a low level of manganese embodiments of the present invention can still produce electrodes which comply with the requirements for E71T-1/9C and E71T-1/9M type electrodes, the requirements of which are incorporated herein by reference in their entirety.

As explained above, exemplary embodiments of the present invention comprise both a sheath and a flux core. In exemplary embodiments of the present invention, the core is in the range of 12 to 20% of the total weight of the electrode, whereas the sheath is in the range of 80 to 88% of the total weight of the electrode. In further exemplary embodiments, the core is in the range of 14 to 18% of the entire weight of the electrode, and the sheath is in the range of 82 to 86% of the total weight. The following Table 1 shows the relative percentages of the ingredients of exemplary embodiments of the present invention. As shown, Table 1 shows the ingredient percentages by weight for each of the sheath and core individually, as well as for the total electrode.

TABLE 1

| INGREDIENT | CORE | SHEATH | ELECTRODE |
| --- | --- | --- | --- |
| Al$_2$O$_3$ | 3.5 to 6.1 | 0.0 | 0.42 to 1.22 |
| SiO$_2$ | 1.5 to 2.1 | 0.0 | 0.18 to 0.42 |
| ZrO$_2$ | 4.5 to 6.5 | 0.0 | 0.5 to 1.3 |
| TiO$_2$ | 30 to 45 | 0.0 | 4 to 9 |
| Na$_2$O | 1.0 to 2.0 | 0.0 | 0.12 to 0.4 |
| K$_2$O | 0.25 to 0.75 | 0.0 | 0.03 to 0.15 |
| Al | 0.5 to 1.5 | 0.0 | 0.06 to 0.3 |
| Mg | 1.1 to 2.4 | 0.0 | 0.13 to 0.48 |
| Ti | 1.3 to 2.1 | 0.0 | 0.15 to 0.42 |
| B | 0.03 to 0.07 | 0.0 | 0.003 to 0.014 |
| Fe | 22 to 38 | 99.4 to 99.9 | 83 to 94 |
| Mo | 0 to 2 | 0.0 | 0 to 0.4 |
| Mn | 0.008 to 0.032 | 0.12 to 0.20 | 0.09 to 0.19 |
| Ni | 2.0 to 2.6 | 0.0 | 0.24 to 0.55 |
| Si | 2.5 to 4.0 | 0.005 to 0.015 | 0.3 to 0.8 |
| C | 0.35 to 0.60 | 0.0 | 0.04 to 0.12 |
| K$_2$SiF$_6$ | 2.0 to 3.0 | 0.0 | 0.2 to 0.6 |

Table 2 below shows the ingredients, in percentages by weight of the various components and entire electrode, for a further exemplary embodiment of the present invention.

TABLE 2

| INGREDIENT | CORE | SHEATH | ELECTRODE |
| --- | --- | --- | --- |
| Al$_2$O$_3$ | 3.7 to 5.8 | 0.0 | 0.45 to 1.2 |
| SiO$_2$ | 1.65 to 1.95 | 0.0 | 0.19 to 0.4 |

TABLE 2-continued

| INGREDIENT | CORE | SHEATH | ELECTRODE |
| --- | --- | --- | --- |
| ZrO$_2$ | 4.8 to 5.4 | 0.0 | 0.6 to 1.1 |
| TiO$_2$ | 35 to 40 | 0.0 | 4 to 8 |
| Na$_2$O | 1.3 to 1.5 | 0.0 | 0.16 to 0.30 |
| K$_2$O | 0.4 to 0.6 | 0.0 | 0.048 to 0.12 |
| Al | 0.85 to 1.15 | 0.0 | 0.10 to 0.23 |
| Mg | 1.2 to 2.2 | 0.0 | 0.15 to 0.45 |
| Ti | 1.6 to 1.85 | 0.0 | 0.19 to 0.38 |
| B | 0.042 to 0.061 | 0.0 | 0.005 to 0.012 |
| Fe | 27 to 33 | 99.6 to 99.9 | 82 to 95 |
| Mo | 0 to 1.9 | 0.0 | 0 to 0.4 |
| Mn | 0.015 to 0.025 | 0.14 to 0.19 | 0.11 to 0.17 |
| Ni | 2.15 to 2.45 | 0.0 | 0.25 to 0.5 |
| Si | 2.8 to 3.8 | 0.008 to 0.012 | 0.4 to 0.6 |
| C | 0.42 to 0.54 | 0.0 | 0.05 to 0.11 |
| K$_2$SiF$_6$ | 2.2 to 2.6 | 0.0 | 0.25 to 0.52 |

It should be generally understood that other trace elements may be present in the composition of the electrodes discussed above. The presence of such trace elements is not inconsistent with the spirit and scope of embodiments of the present invention. Further, it should also be noted that while the presence of molybdenum (Mo) is found in some embodiments (as shown with the higher ranges for this element in the tables above), in some exemplary embodiments no Mo is intentional added to the consumable. While in some exemplary embodiments the presence of Mo increase strength characteristics of the weld, it has been found that embodiments having no intentional added Mo can also produce adequate strength as described herein. In such embodiments, while no Mo is intentionally added, trace amounts can be present in the range of 0.02 to 0.03% by weight of the consumable. It should be further noted that in some exemplary embodiments of fluxed core electrodes set forth in each of Tables 1 and 2, the electrodes and/or their respective components consistent essentially of the ingredients listed in each of Tables 1 and 2, respectively.

As shown above, fluxed cored electrodes have an overall manganese content in the range of 0.09 to 0.19% by weight of the electrode. In further exemplary embodiments, the amount of manganese is in the range of 0.11 to 0.17% by weight of the electrode, and in even further exemplary embodiments, the amount is in the range of 0.13 to 0.17% by weight of the electrode, and in even further embodiments of the present invention the amount of manganese is in the range of 0.14 to 0.16% by weight of the electrode. It is further noted any one of these percentage ranges can be used in either of the electrode configurations shown in either of Tables 1 or 2. That is, for example, the exemplary electrode in either Table 1 or Table 2 can use manganese in a range of 0.14 to 0.16% by weight of the electrode.

The exemplary embodiments included in the Tables above can be used with any known FCAW welding process to produce high quality welds, while using a consumable with significantly reduced amounts of manganese in the fumes and in the weld deposit, when compared to known consumables. In fact, as an example, exemplary embodiments of the present invention can be manufactured to satisfy the standards for each of the of the E71T-1/9C and E71T-1/9M electrode type standards. As shown in each of the Tables 3 and 4 below, electrodes made in accordance with exemplary embodiments of the present invention can produce weld deposits with significantly reduced manganese content. The ingredient data shown in each of tables 3 and 4 show the weight percentage by weight of the undiluted weld deposit. Each of the Tables 3 and 4 represent weld deposit weight percentages achievable using a welding process having the following exemplary properties: (1) electrode diameter is 1/16"; (2) wire feed speed (WFS) 250; (3) approximate current of 295 amps; (4) voltage of 27 volts (Table 3) or 25 volts (Table 4); (5) contact to work distance (CTWD) of 1 inch; (6) travel speed of 12 ipm; (7) heat input of 36 kj; (8) preheat of 72° F.; and (9) interpass heat of 325° F. Of course, these conditions are exemplary and embodiments of the present invention can be used with other welding conditions without departing from the spirit or scope of the present invention. Further, welding with other conditions can still result in the desired low manganese weld deposits shown below. Also, because Table 3 represents data for a E71T-1/9C type electrode the shielding gas used to generate the data is 100% $CO_2$, and since Table 4 represents data for a E71T-1/9M type electrode the shielding gas used to generate the data is 75% Ar and 25% $CO_2$.

TABLE 3

| INGREDIENT | WELD DEPOSIT |
|---|---|
| C | 0.05 to 0.1 |
| S | 0.004 to 0.014 |
| N | 0.004 to 0.014 |
| O | 0.06 to 0.08 |
| Al | 0.004 to 0.014 |
| As | 0.00 |
| B | 0.0035 to 0.0054 |
| Ca | 0.00 |
| Cd | 0.00 |
| Co | 0.00 |
| Cr | 0.022 to 0.038 |
| Cu | 0.01 to 0.03 |
| Mn | 0.09 to 0.15 |
| Mo | 0.00 to 0.30 |
| Nb | 0.00 |
| Ni | 0.30 to 0.52 |
| P | 0.00 |
| Pb | 0.00 |
| Sb | 0.00 |
| Si | 0.38 to 0.68 |
| Sn | 0.00 |
| Ta | 0.00 |
| Ti | 0.06 to 0.08 |
| V | 0.00 |
| W | 0.005 to 0.015 |
| Zr | 0.00 |

The balance of the exemplary weld deposit shown in Table 3 will be Fe and perhaps additional impurities. Further, it should be noted that where it is indicated above that the weight percentage is "0.00", in some embodiments a trace or diminimus amount of the element could be found due to impurities without departing from the spirit or scope of the present invention. Additionally, the Table above shows the presence of elements, such as S, N, As, Cr, Cu, P, and W which did not appear in either of Tables 1 and 2 showing the ingredients of the consumable used to generate the data of Table 3. It should be understood by those of ordinary skill in the art that the presence of these elements in the deposit can result from the welding process, and can be present due to impurities, trace amounts of the element in the electrode or a coating on the electrode, and/or trace amounts of these elements in the welding base plate or weld metal.

The following Table 4 shows similar data to that shown in FIG. 3, except that Table 4 shows data from an E71T-1/9M type electrode using an Ar/$CO_2$ mix shielding gas.

TABLE 4

| INGREDIENT | WELD DEPOSIT |
|---|---|
| C | 0.05 to 0.10 |
| S | 0.004 to 0.014 |
| N | 0.004 to 0.014 |
| O | 0.06 to 0.08 |
| Al | 0.004 to 0.020 |
| As | 0.00 |
| B | 0.0035 to 0.0054 |
| Ca | 0.00 |
| Cd | 0.00 |
| Co | 0.00 |
| Cr | 0.022 to 0.038 |
| Cu | 0.01 to 0.03 |
| Mn | 0.10 to 0.16 |
| Mo | 0.00 to 0.3 |
| Nb | 0.00 |
| Ni | 0.3 to 0.52 |
| P | 0.00 |
| Pb | 0.00 |
| Sb | 0.00 |
| Si | 0.38 to 0.68 |
| Sn | 0.00 |
| Ta | 0.00 |
| Ti | 0.06 to 0.11 |
| V | 0.00 |
| W | 0.005 to 0.015 |
| Zr | 0.00 |

As shown in the Table 4 above, the data is similar as that for Table 3. It should be noted that the above discussion regarding the presence of trace amounts of elements and impurities equally applies to this Table 4.

As shown in each of the above Tables 3 and 4, exemplary rutile type flux cored electrodes of the present invention can produce weld deposits having a manganese level in the range of 0.09 to 0.16% be weight of the weld deposit. In fact, some exemplary embodiments of the present invention can produce weld deposits having a Mn content in the range of 0.095 to 0.115% by weight of the weld deposit. In each case, this is significantly lower than the 1.75% by weight set forth in the E71T-1/9C and -1/9M standards. Further, this is significantly lower than other known low manganese welding consumables.

Further, even though the exemplary embodiments discussed herein have a low manganese content and produce weld deposits with a low manganese content, the electrodes discussed herein can produce welds satisfy all of the needed structural and strength characteristics. Specifically, embodiments of the present invention can produce weld deposits having a tensile strength on the range of 70 to 95 ksi, a minimum yield strength of at least 58 ksi, a minimum elongation of at least 22% and a minimum Charpy V-Notch toughness at −20° F. of 20 ft*lbs. Thus, exemplary embodiments of the present invention provide gas shielding rutile type flux cored electrodes having a significantly reduced manganese content, but still provide structural sound welds.

Another exemplary embodiment of a flux cored electrode of the present application is a calcium fluoride $CaF_2$ based electrode or a basic slag type electrode. FIG. 1 also diagrammatically represents an electrode of this embodiment, having a flux core 120, which can be made in a similar fashion to the flux cored electrode type discussed above. Exemplary embodiments of the present invention, while having low levels of manganese, also satisfy the requirements for E70T-5C and E70T-5M type electrodes, the requirements of which are incorporated herein by reference in their entirety.

Like Table 1, the following Table 5 shows the ingredients for exemplary embodiments of the present invention of a basic slag type. The table shows the percentages by weight for each of the sheath, the core and the overall electrode. In exemplary embodiments, the core is in the range of 20 to 30% of the total weight of the electrode, whereas the sheath is in the range of 70 to 80% of the total weight of the electrode. In further exemplary embodiments, the core is in the range of 22.5 to 27.5% of the entire weight of the electrode, and the sheath is in the range of 72.5 to 77.5% of the total weight.

TABLE 5

| INGREDIENT | CORE | SHEATH | ELECTRODE |
|---|---|---|---|
| $SiO_2$ | 1.2 to 2.0 | 0.000 | 0.24 to 0.6 |
| $ZrO_2$ | 0.000 | 0.000 | 0.000 |
| $TiO_2$ | 2.5 to 3.5 | 0.000 | 0.05 to 1.05 |
| $K_2O$ | 0.55 to 0.95 | 0.000 | 0.1 to 0.3 |
| $CaF_2$ | 19 to 30 | 0.000 | 3.8 to 9 |
| Al | 0.3 to 0.5 | 0.004 to 0.006 | 0.06 to 0.16 |
| B | 0.000 | 0.000 | 0.000 |
| Ti | 0.000 | 0.025 to 0.035 | 0.02 to 0.03 |
| Fe | 58 to 72 | 99.1 to 99.9 | 88 to 94 |
| Mg | 0.000 | 0.000 | 0.000 |
| Mn | 0.045 to 0.065 | 0.12 to 0.22 | 0.09 to 0.19 |
| Ni | 1.2 to 2.0 | 0.04 to 0.06 | 0.27 to 0.65 |
| Si | 2.5 to 4.1 | 0.0025 to 0.0075 | 0.5 to 1.1 |
| C | 0.22 to 0.34 | 0.005 to 0.015 | 0.05 to 0.11 |

Table 6 below shows the ingredients, in percentages by weight of the various components and entire electrode, for a further exemplary embodiment of the present invention.

TABLE 6

| INGREDIENT | CORE | SHEATH | ELECTRODE |
|---|---|---|---|
| $SiO_2$ | 1.4 to 1.8 | 0.000 | 0.28 to 0.54 |
| $ZrO_2$ | 0.000 | 0.000 | 0.000 |
| $TiO_2$ | 2.8 to 3.2 | 0.000 | 0.56 to 0.96 |
| $K_2O$ | 0.68 to 0.82 | 0.000 | 0.14 to 0.25 |
| $CaF_2$ | 20 to 28 | 0.000 | 4.3 to 7.8 |
| Al | 0.35 to 0.45 | 0.0045 to 0.0055 | 0.07 to 0.15 |
| B | 0.000 | 0.000 | 0.000 |
| Ti | 0.000 | 0.027 to 0.032 | 0.02 to 0.03 |
| Fe | 62 to 68 | 99.5 to 99.9 | 88 to 93 |
| Mg | 0.000 | 0.000 | 0.000 |
| Mn | 0.05 to 0.06 | 0.15 to 0.19 | 0.11 to 0.18 |
| Ni | 1.4 to 1.8 | 0.04 to 0.06 | 0.28 to 0.55 |
| Si | 2.9 to 3.7 | 0.004 to 0.006 | 0.58 to 1.12 |
| C | 0.25 to 0.31 | 0.008 to 0.012 | 0.05 to 0.11 |

As with the electrodes described in Tables 1 and 2, the electrodes described in Tables 5 and 6, can contain other trace elements may be present in the composition of the electrodes discussed above. The presence of such trace elements is not inconsistent with the spirit and scope of embodiments of the present invention. However, as noted above, the above described electrodes in each of Tables 5 and 6 do not have any intentionally added $ZrO_2$, B, or Mg. It is noted that these components can be present in trace amounts due to impurities, or the like, without departing from embodiments of the present invention—but they are not intentionally added. It should be further noted that in some exemplary embodiments of fluxed core electrodes set forth in each of Tables 5 and 6, the electrodes and/or their respective components consistent essentially of the ingredients listed in each of Tables 5 and 6, respectively.

As shown above, fluxed cored electrodes have an overall manganese content in the range of 0.09 to 0.19% by weight of the electrode. In further exemplary embodiments, the amount of manganese is in the range of 0.11 to 0.18% by weight of the electrode. In further exemplary embodiments, the amount of manganese is in the range of 0.12 to 0.16% by weight of the electrode, and in even further exemplary embodiments, the amount is in the range of 0.13 to 0.15% by weight of the electrode. It is further noted any one of these percentage ranges can be used in either of the electrode configurations shown in either of Tables 5 or 6. That is, for example, the exemplary electrode in either Table 5 or Table 6 can use manganese in a range of 0.13 to 0.15% by weight of the electrode.

The exemplary embodiments included in the Tables above can be used with any known FCAW welding process to produce high quality welds, while using a consumable with significantly reduced amounts of manganese in the fumes and in the weld deposit, when compared to known consumables. In fact, as an example, exemplary embodiments of the present invention can be manufactured to satisfy the standards for each of the of the E70T-5C and E70T-5M electrode type standards. As shown in each of the Tables 7 and 8 below, electrodes made in accordance with exemplary embodiments of the present invention can produce weld deposits with significantly reduced manganese contents. The ingredient data shown in each of tables 7 and 8 show the weight percentage by weight of the undiluted weld deposit. Each of the Tables 7 and 8 represent weld deposit weight percentages achievable using a welding process having with the following exemplary properties: (1) electrode diameter is 3/32"; (2) wire feed speed (WFS) 200; (3) approximate current of 430 amps; (4) voltage of 31 volts (Table 7) or 29 volts (Table 8); (5) contact to work distance (CTWD) of 1.25 inch; (6) travel speed of 12 ipm; (7) heat input of 60 kj; (8) preheat of 72° F.; and (9) interpass heat of 325° F. Of course, these conditions are exemplary and embodiments of the present invention can be used with other welding conditions without departing from the spirit or scope of the present invention. Further, welding with other conditions can still result in the desired low manganese weld deposits shown below. Also, because Table 7 represents data for a E70T-5C type electrode the shielding gas used to generate the data is 100% $CO_2$, and since Table 8 represents data for a E70T-5M type electrode the shielding gas used to generate the data is 75% Ar and 25% $CO_2$.

TABLE 7

| INGREDIENT | WELD DEPOSIT |
|---|---|
| C | 0.06 to 0.10 |
| S | 0.005 to 0.007 |
| N | 0.006 to 0.008 |
| O | 0.04 to 0.06 |
| Si | 0.4 to 0.8 |
| Mn | 0.11 to 0.22 |
| Ni | 0.3 to 0.5 |
| Al | 0.015 to 0.025 |
| Ti | 0.015 to 0.025 |
| Mo | 0.005 to 0.015 |
| Zr | 0.00 |
| As | 0.00 |
| B | 0.00 |
| Ca | 0.00 |
| Cd | 0.00 |
| Co | 0.00 |
| Cr | 0.02 to 0.04 |
| Cu | 0.02 to 0.04 |
| Nb | 0.00 |
| P | 0.005 to 0.015 |
| Pb | 0.00 |
| Sb | 0.00 |
| Sn | 0.00 |

TABLE 7-continued

| INGREDIENT | WELD DEPOSIT |
|---|---|
| Ta | 0.00 |
| V | 0.00 |
| W | 0.005 to 0.015 |

The balance of the exemplary weld deposit shown in Table 7 will be Fe and perhaps additional impurities. Further, it should be noted that where it is indicated above that the weight percentage is "0.00", in some embodiments a trace or diminimus amount of the element could be found due to impurities without departing from the spirit or scope of the present invention. It should be noted that other exemplary embodiments of the present invention, with the compositions shown in Tables 5 and 6 can produce weld deposits having a manganese content in the range of 0.13 to 0.16 by weight of the weld deposit and still satisfy the requirements of E70T-5C type electrodes. Additionally, the Table above shows the presence of elements, such as S, N, Cr, Cu, P, and W which did not appear in either of Tables 5 and 6 showing the ingredients of the consumable used to generate the data of Table 7. It should be understood by those of ordinary skill in the art that the presence of these elements in the deposit can result from the welding process, and can be present due to impurities or trace amounts of the element in the electrode or a coating on the electrode.

The following Table 8 shows similar data to that shown in FIG. 7, except that Table 8 shows data from an E70T-5M type electrode using an Ar/$CO_2$ mix shielding gas.

TABLE 8

| INGREDIENT | WELD DEPOSIT |
|---|---|
| C | 0.06 to 0.10 |
| S | 0.004 to 0.006 |
| N | 0.005 to 0.007 |
| O | 0.07 to 0.09 |
| Si | 0.4 to 0.8 |
| Mn | 0.12 to 0.23 |
| Ni | 0.3 to 0.5 |
| Al | 0.05 to 0.07 |
| Ti | 0.02 to 0.04 |
| Mo | 0.005 to 0.015 |
| Zr | 0.00 |
| As | 0.00 |
| B | 0.00 |
| Ca | 0.00 |
| Cd | 0.00 |
| Co | 0.00 |
| Cr | 0.02 to 0.04 |
| Cu | 0.02 to 0.04 |
| Nb | 0.00 |
| P | 0.005 to 0.015 |
| Pb | 0.00 |
| Sb | 0.00 |
| Sn | 0.00 |
| Ta | 0.00 |
| V | 0.00 |
| W | 0.005 to 0.015 |

As shown in the Table 8 above, the data is the similar as that for Table 7. It should be noted that the above discussion regarding the presence of trace amounts of elements and impurities equally applies to this Table 8.

As shown in each of the above Tables 7 and 8, exemplary basic type flux cored electrodes of the present invention can produce weld deposits having a manganese level in the range of 0.11 to 0.20% be weight of the weld deposit. In fact, some exemplary embodiments of the present invention can produce weld deposits having a Mn content in the range of 0.13 to 0.18% by weight of the weld deposit. Further, for exemplary electrodes that satisfy the E70T-5C type requirements, embodiments of the present invention can produce a weld deposit having a manganese content in the range of 0.13 to 0.17% by weight of the weld deposit, and for exemplary electrodes that satisfy the E70T-5M type requirements, embodiments of the present invention can produce a weld deposit having a manganese content in the range of 0.15 to 0.19% by weight of the weld deposit. In each case, this is significantly lower than the 1.75% by weight set forth in the E70T-5C and -5M standards. Further, this is significantly lower than other known low manganese welding consumables.

Further, even though the exemplary embodiments discussed herein have a low manganese content and produce weld deposits with a low manganese content, the electrodes discussed herein can produce welds satisfy all of the needed structural and strength characteristics. Specifically, embodiments of the present invention can produce weld deposits having a tensile strength on the range of 70 to 95 ksi, a minimum yield strength of at least 58 ksi, a minimum elongation of at least 22% and a minimum Charpy V-Notch toughness at −20° F. of 20 ft*lbs. Thus, exemplary embodiments of the present invention provide gas shielding basic type flux cored electrodes having a significantly reduced manganese content, but still provide structural sound welds.

FIG. 2 depicts another exemplary embodiment of the present invention, which is a welding electrode 200 having a metal core configuration. The electrode 200 contains a metal sheath 210 which surrounds a metal core 220. As with flux cored electrodes, the construction of metal core consumables is well known and need not be described in detail herein. Exemplary embodiments of the present invention, while having low levels of manganese, also satisfy the requirements for E70C-6M type electrodes, the requirements of which are incorporated herein by reference in their entirety.

Like Tables 1 and 5 the following Table 9 shows the ingredients for exemplary embodiments of the present invention of a metal core consumable. The table shows the percentages by weight for each of the sheath, the core and the overall electrode. In exemplary embodiments, the metal core is in the range of 16 to 26% of the total weight of the electrode, whereas the sheath is in the range of 74 to 84% of the total weight of the electrode. In further exemplary embodiments, the core is in the range of 18 to 24% of the entire weight of the electrode, and the sheath is in the range of 77 to 81% of the total weight.

TABLE 9

| INGREDIENT | CORE | SHEATH | ELECTRODE |
|---|---|---|---|
| $SiO_2$ | 0.000 | 0.000 | 0.000 |
| $ZrO_2$ | 0.000 | 0.000 | 0.000 |
| $TiO_2$ | 0.000 | 0.000 | 0.000 |
| $K_2O$ | 0.000 | 0.000 | 0.000 |
| $CaF_2$ | 0.000 | 0.000 | 0.000 |
| Al | 0.35 to 0.65 | 0.004 to 0.006 | 0.06 to 0.18 |
| B | 0.000 | 0.000 | 0.000 |
| Ti | 0.10 to 0.40 | 0.02 to 0.04 | 0.03 to 0.14 |
| Fe | 92 to 98 | 99.3 to 99.9 | 97 to 99 |
| Mg | 0.000 | 0.000 | 0.000 |
| Mn | 0.05 to 0.09 | 0.12 to 0.20 | 0.09 to 0.19 |
| Ni | 1.7 to 2.3 | 0.04 to 0.06 | 0.3 to 0.6 |
| Si | 2.5 to 4.0 | 0.003 to 0.007 | 0.4 to 1.1 |
| C | 0.4 to 0.55 | 0.008 to 0.012 | 0.06 to 0.15 |

Table 10 below shows the ingredients, in percentages by weight of the various components and entire electrode, for a further exemplary embodiment of the present invention.

TABLE 10

| INGREDIENT | CORE | SHEATH | ELECTRODE |
|---|---|---|---|
| $SiO_2$ | 0.000 | 0.000 | 0.000 |
| $ZrO_2$ | 0.000 | 0.000 | 0.000 |
| $TiO_2$ | 0.000 | 0.000 | 0.000 |
| $K_2O$ | 0.000 | 0.000 | 0.000 |
| $CaF_2$ | 0.000 | 0.000 | 0.000 |
| Al | 0.4 to 0.6 | 0.0045 to 0.0055 | 0.06 to 0.16 |
| B | 0.000 | 0.000 | 0.000 |
| Ti | 0.15 to 0.30 | 0.025 to 0.035 | 0.04 to 0.11 |
| Fe | 91 to 96 | 99.5 to 99.9 | 97 to 99 |
| Mg | 0.000 | 0.000 | 0.000 |
| Mn | 0.065 to 0.089 | 0.15 to 0.19 | 0.12 to 0.18 |
| Ni | 1.8 to 2.2 | 0.04 to 0.06 | 0.3 to 0.63 |
| Si | 2.8 to 3.8 | 0.004 to 0.006 | 0.4 to 1.0 |
| C | 0.425 to 0.525 | 0.009 to 0.011 | 0.07 to 0.15 |

As with the electrodes described in the other embodiments herein, the embodiments disclosed in Tables 9 and 10 can contain other trace elements may be present in the composition of the electrodes discussed above. The presence of such trace elements is not inconsistent with the spirit and scope of embodiments of the present invention. However, as shown in the above Tables, the above described electrodes in each of Tables 9 and 10 do not have any intentionally added $SiO_2$, ZrO2, $TiO_2$, $K_2O$, $CaF_2$, B, or Mg. It is noted that these components can be present in trace amounts due to impurities, or the like, without departing from embodiments of the present invention—but they are not intentionally added. It should be further noted that in some exemplary embodiments of fluxed core electrodes set forth in each of Tables 10 and 11, the electrodes and/or their respective components consistent essentially of the ingredients listed in each of Tables 10 and 11, respectively.

As shown above, exemplary metal cored electrodes have an overall manganese content in the range of 0.09 to 0.19% by weight of the electrode. In further exemplary embodiments, the amount of manganese is in the range of 0.12 to 0.18% by weight of the electrode. In additional exemplary embodiments, the amount of manganese is in the range of 0.13 to 0.17% by weight of the electrode, and in even further exemplary embodiments, the amount is in the range of 0.14 to 0.16% by weight of the electrode.

The exemplary embodiments included in the Tables above can be used with any known FCAW welding process to produce high quality welds, while using a consumable with significantly reduced amounts of manganese in the fumes and in the weld deposit, when compared to known consumables. In fact, as an example, exemplary embodiments of the present invention can be manufactured to satisfy the standards for the E70C-6M electrode type standards. As shown in Table 12 below, electrodes made in accordance with exemplary embodiments of the present invention can produce weld deposits with significantly reduced manganese contents. The ingredient data shown in Table 12 shows the weight percentage by weight of the undiluted weld deposit. Table 12 represents weld deposit weight percentages achievable using a welding process having with the following exemplary properties: (1) electrode diameter is 1/16"; (2) wire feed speed (WFS) 265; (3) approximate current of 325 amps; (4) voltage of 25.5 volts; (5) contact to work distance (CTWD) of 0.75 inch; (6) travel speed of 10 ipm; (7) heat input of 45 kj; (8) preheat of 70° F.; and (9) interpass heat of 300° F. Further, the shielding gas is 5% $CO_2$ and 95% Ar. Of course, these conditions are exemplary and embodiments of the present invention can be used with other welding conditions without departing from the spirit or scope of the present invention. Further, welding with other conditions can still result in the desired low manganese weld deposits shown below.

The following Table 12 shows exemplary data for an embodiment of the present invention, which satisfies the requirements E70C-6M type electrodes.

TABLE 12

| INGREDIENT | WELD DEPOSIT |
|---|---|
| C | 0.06 to 0.10 |
| S | 0.004 to 0.006 |
| N | 0.005 to 0.007 |
| O | 0.065 to 0.095 |
| Si | 0.4 to 0.7 |
| Mn | 0.08 to 0.22 |
| Ni | 0.3 to 0.5 |
| Al | 0.04 to 0.06 |
| Ti | 0.005 to 0.015 |
| Mo | 0.005 to 0.015 |
| Zr | 0.00 |
| As | 0.00 |
| B | 0.00 |
| Ca | 0.00 |
| Cd | 0.00 |
| Co | 0.00 |
| Cr | 0.02 to 0.04 |
| Cu | 0.02 to 0.04 |
| Nb | 0.00 |
| P | 0.005 to 0.015 |
| Pb | 0.00 |
| Sb | 0.00 |
| Sn | 0.00 |
| Ta | 0.00 |
| V | 0.00 |
| W | 0.005 to 0.015 |

It should be noted that, as with other exemplary embodiments of electrodes discussed herein, the above discussion regarding the presence of trace amounts of elements and impurities equally applies to this Table 12.

As shown in Tables 12, exemplary basic type metal cored electrodes of the present invention can produce weld deposits having a manganese level in the range of 0.08 to 0.22% be weight of the weld deposit which satisfy the E70C-6M electrode type requirements, and in other embodiments can be in the range of 0.12 to 0.22%. In fact, some exemplary embodiments of the present invention can produce weld deposits having a Mn content in the range of 0.14 to 0.19% by weight of the weld deposit. This is significantly lower than other known low manganese welding consumables.

Further, even though the exemplary embodiments discussed herein have a low manganese content and produce weld deposits with a low manganese content, the electrodes discussed herein can produce welds satisfy all of the needed structural and strength characteristics. Specifically, metal core embodiments of the present invention can produce weld deposits having a tensile strength of at least 70 ksi, a minimum yield strength of at least 58 ksi, a minimum elongation of at least 22% and a minimum Charpy V-Notch toughness at −20° F. of 20 ft*lbs. Thus, exemplary embodiments of the present invention provide metal cored electrodes having a significantly reduced manganese content, but still provide structural sound welds.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the present application.

We claim:

1. A flux cored electrode, comprising:
an iron based metal sheath; and
a titanium dioxide based flux core, which is surrounded by said iron based metal sheath;
wherein said electrode further comprises, by weight of the electrode:
manganese in the range of 0.09 to 0.19%;
boron in the range of 0.003 to 0.014%;
carbon in the range of 0.04 to 0.12%;
silicon in the range of 0.3 to 0.8%;
molybdenum in the range of 0 to 0.4%;
titanium in the range of 0.15 to 0.42%; and
aluminum in the range of 0.06 to 0.3%.

2. The flux cored electrode of claim 1, wherein said manganese is in the range of 0.11 to 0.17% by weight.

3. The flux cored electrode of claim 1, wherein said manganese is in the range of 0.14 to 0.16% by weight.

4. The flux cored electrode of claim 1, wherein said titanium dioxide is in the range of 30 to 45% by weight of said flux core.

5. The flux cored electrode of claim 1, wherein said titanium dioxide is in the range of 35 to 40% by weight of said flux core.

6. The flux cored electrode of claim 1, wherein:
said boron is in the range of 0.005 to 0.012%;
said carbon is in the range of 0.05 to 0.11%;
said silicon is in the range of 0.4 to 0.6%;
said titanium is in the range of 0.19 to 0.38%; and
said aluminum is in the range of 0.10 to 0.23%.

7. The flux cored electrode of claim 1, wherein said sheath is in the range of 80 to 88% of the weight of said cored electrode.

8. A flux cored electrode, comprising:
an iron based metal sheath; and
a calcium fluoride based flux core, which is surrounded by said iron based metal sheath;
wherein said electrode further comprises, by weight of the electrode:
manganese in the range of 0.09 to 0.19%;
carbon in the range of 0.05 to 0.11%;
silicon in the range of 0.5 to 1.1%;
titanium in the range of 0.02 to 0.03%; and
aluminum in the range of 0.06 to 0.16%.

9. The flux cored electrode of claim 8, wherein said manganese is in the range of 0.12 to 0.16% by weight.

10. The flux cored electrode of claim 8, wherein said manganese is in the range of 0.13 to 0.15% by weight.

11. The flux cored electrode of claim 8, wherein said calcium fluoride is in the range of 19 to 30% by weight of said flux core.

12. The flux cored electrode of claim 8, wherein said calcium fluoride is in the range of 20 to 28% by weight of said flux core.

13. The flux cored electrode of claim 8, wherein: said aluminum is in the range of 0.07 to 0.15%.

14. The flux cored electrode of claim 8, wherein said sheath is in the range of 70 to 80% of the weight of said cored electrode.

15. The flux cored electrode of claim 8, wherein none of zirconium dioxide, boron or magnesium are intentionally present in said flux cored electrode.

16. A metal cored electrode, comprising:
an iron based metal sheath; and
an iron based core, which is surrounded by said iron based metal sheath;
wherein said electrode further comprises, by weight of the electrode:
manganese in the range of 0.09 to 0.19%;
carbon in the range of 0.06 to 0.15%;
silicon in the range of 0.4 to 1.1%;
titanium in the range of 0.03 to 0.14%; and
aluminum in the range of 0.06 to 0.18%.

17. The metal cored electrode of claim 16, wherein said manganese is in the range of 0.12 to 0.18% by weight.

18. The metal cored electrode of claim 16, wherein said manganese is in the range of 0.14 to 0.16% by weight.

19. The metal cored electrode of claim 16, wherein said iron based core comprises nickel in the range of 1.7 to 2.3% by weight of said iron based core.

20. The metal cored electrode of claim 16, wherein:
said carbon is in the range of 0.07 to 0.15%;
said silicon is in the range of 0.4 to 1%;
said titanium is in the range of 0.04 to 0.11%; and
said aluminum is in the range of 0.06 to 0.16%.

21. The metal cored electrode of claim 16, wherein said sheath is in the range of 74 to 84% of the weight of said cored electrode.

22. The metal cored electrode of claim 16, wherein none of silicon dioxide, zirconium dioxide, titanium dioxide, potassium oxide, calcium fluoride, boron or magnesium are intentionally present in said metal cored electrode.

* * * * *